(12) United States Patent
Ishikawa

(10) Patent No.: US 6,520,273 B1
(45) Date of Patent: Feb. 18, 2003

(54) FUEL CELLS SYSTEM AND ELECTRIC CAR MOUNTING IT AND STARTING CONTROL METHOD FOR FUEL CELL SYSTEM

(75) Inventor: Seiji Ishikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/700,386

(22) PCT Filed: Feb. 19, 1999

(86) PCT No.: PCT/JP99/00758

§ 371 (c)(1),
(2), (4) Date: Nov. 14, 2000

(87) PCT Pub. No.: WO99/59217

PCT Pub. Date: Nov. 18, 1999

(30) Foreign Application Priority Data

May 14, 1998 (JP) .......................... 10-152111

(51) Int. Cl.[7] .............................. B60K 6/00; B60K 6/04
(52) U.S. Cl. ...................................... 180/65.3
(58) Field of Search ............... 180/65.1, 65.2, 180/65.3, 65.4, 65.8; 429/24; 701/22; 318/587

(56) References Cited

U.S. PATENT DOCUMENTS

| | | | | |
|---|---|---|---|---|
| 4,670,702 A | * | 6/1987 | Yamada et al. ............... 320/21 |
| 4,961,151 A | * | 10/1990 | Early et al. ................. 180/65.8 |
| 5,228,529 A | * | 7/1993 | Rosner ...................... 180/65.3 |
| 5,482,790 A | | 1/1996 | Yamada et al. |
| 5,631,532 A | * | 5/1997 | Azuma et al. ................. 320/5 |
| 5,678,647 A | * | 10/1997 | Wolfe et al. ................ 180/65.3 |
| 5,808,448 A | * | 9/1998 | Naito ........................... 322/13 |
| 5,900,330 A | * | 5/1999 | Kagatani ...................... 429/24 |
| 5,991,670 A | * | 11/1999 | Mufford et al. ............. 180/65.3 |

FOREIGN PATENT DOCUMENTS

| | | |
|---|---|---|
| JP | 58-23167 | 2/1983 |
| JP | 1-278239 | 11/1989 |
| JP | 3-81971 | 4/1991 |
| JP | 4-47673 | 2/1992 |
| JP | 4-262371 | 9/1992 |
| JP | 6-124720 | 5/1994 |
| JP | 6-150952 | 5/1994 |
| JP | 8-289410 | 11/1996 |
| JP | 9-70196 | 3/1997 |
| JP | 9-231991 | 9/1997 |

* cited by examiner

*Primary Examiner*—Avraham Lerner
(74) *Attorney, Agent, or Firm*—Oblon, Spivak, McClelland, Maier & Neustadt, P.C.

(57) ABSTRACT

In the case where internal temperature of fuel cells 40 has not reached a stationary level (step S26), a control unit 100 disconnects a secondary battery 60 from an inverter 70 (step S28) and controls the drive of a motor 80 (step S30), in order to cause the motor 80 to consume electric power supplied from the fuel cells 40 while the inverter 70 functions to prevent any torque from being produced at a drive shaft 82 of the motor 80. Such control enables the internal temperature of the fuel cells to be raised to the stationary level in a shortest possible time at the time of activating the fuel cells.

5 Claims, 4 Drawing Sheets

FUEL CELLS SYSTEM AND ELECTRIC CAR MOUNTING IT AND STARTING CONTROL METHOD FOR FUEL CELL SYSTEM

TECHNICAL FIELD

The present invention relates to a technique that minimizes a time period required for raising internal temperature of fuel cells to a stationary level (that is, a preset temperature capable of generating a required output) at the time of activating the fuel cells.

BACKGROUND ART

Fuel cells, which receive a supply of gaseous fuel and generate electric power, have a high energy efficiency and are thereby promising as a power source of electric vehicles. In the case where the fuel cells are used as the power source of an electric vehicle, a motor is driven with the electric power generated by the fuel cells and outputs a torque, which is transmitted to an axle to give a propulsive force of the electric vehicle. The following problem, however, arises when the fuel cells are used as the power source of an electric vehicle.

The fuel cells having low internal temperature do not generate a sufficient output to fulfill a required output of the electric vehicle. It is accordingly required to raise the internal temperature of the fuel cells to the stationary level when the fuel cells are used as the power source of the electric vehicle. At the time of starting the electric vehicle, that is, at the time of activating the fuel cells, the fuel cells have low internal temperature. It accordingly takes a relatively long time to raise the internal temperature of the fuel cells to the stationary level with the Joule heat generated through electrochemical reactions.

In order to solve such a problem, the prior art technique, for example, as disclosed in JAPANESE PATENT LAID-OPEN GAZETTE No. 58-23167, drives the motor by means of a secondary battery, which is connected in parallel with the fuel cells, at the time of activating the fuel cells, cools down the motor with the air, and feeds the warm air, which has been heated through the motor-cooling process, to the fuel cells to raise the internal temperature of the fuel cells to the stationary level in a shorter time period.

Since a rotor and a stator included in the motor have large heat capacities, the temperature of the motor does not rise to a high level immediately after the start of the motor. The air that is used to cool down the motor and then fed to the fuel cells accordingly does not have a sufficiently high temperature at the time of starting the motor. This proposed technique thus requires some time to raise the internal temperature of the fuel cells to the stationary level at the time of activating the fuel cells.

The object of the present invention is thus to solve the problems arising in the prior art techniques and to provide a fuel cells system that is capable of raising internal temperature of fuel cells to a stationary level in a shortest possible time at the time of activating the fuel cells, as well as a method of controlling actuation of such a fuel cells system.

DISCLOSURE OF THE INVENTION

At least part of the above and the other related objects is attained by a first fuel cells system of the present invention including fuel cells that receive a supply of gaseous fuel and generate electric power.

The first fuel cells system includes: a motor that is driven with the electric power output from the fuel cells; and a motor control unit that controls drive of the motor. The motor control unit controls the drive of the motor, in order to cause the motor to consume the electric power output from the fuel cells without producing any torque at a drive shaft of the motor at the time of activating the fuel cells.

The present invention is also directed to a first method of controlling actuation of a fuel cells system, which includes: fuel cells that receive a supply of gaseous fuel and generate electric power; and a motor that is driven with the electric power output from the fuel cells.

The first method includes the steps of:

(a) controlling activation of the fuel cells;

(b) controlling drive of the motor, in order to cause the motor to consume the electric power output from the fuel cells without producing any torque at a drive shaft of the motor at the time of activating the fuel cells.

The first fuel cells system of the present invention and the corresponding first method of controlling actuation of the fuel cells system control drive of the motor, in order to cause the motor to consume electric power output from the fuel cells without producing any torque at the drive shaft of the motor.

In the first fuel cells system of the present invention and the corresponding first method of controlling actuation of the fuel cells system, at the time of activating the fuel cells, the motor is controlled to consume the electric power output from the fuel cells at the time of activating the fuel cells. This arrangement causes the electric power to be forcibly drawn from the fuel cells and thereby enhances the electrochemical reactions proceeding in the fuel cells. The enhanced reactions increase the Joule heat and enable the internal temperature of the fuel cells to be raised to the stationary level in a short time period. While the motor consumes the electric power, no torque is produced at the drive shaft of the motor. Namely the motor is not practically actuated under the condition of an insufficient output of the fuel cells. For example, in the case where the fuel cells system is mounted on the electric vehicle, the electric vehicle is not driven while the output of the fuel cells is not sufficient for the required output of the electric vehicle.

In accordance with one preferable application of the present invention, the first fuel cells system further includes a temperature detection unit that measures internal temperature of the fuel cells. The motor control unit controls the drive of the motor to vary the electric power consumed by the motor according to the observed internal temperature.

The arrangement of varying the electric power drawn out of the fuel cells according to the observed internal temperature of the fuel cells enables the internal temperature of the fuel cells to be raised to the stationary level at a high efficiency in a shorter time period without exceeding the allowable range of the electric power produced by the fuel cells.

In accordance with another preferable application of the present invention, the first fuel cells system further includes: a secondary battery that is capable of supplying electric power to the motor, in order to drive the motor; and a battery supply regulation unit that regulates a supply of electric power from the secondary battery to the motor. The battery supply regulation unit cuts off the supply of electric power from the secondary battery to the motor at the time of activating the fuel cells.

In the structure including the secondary battery, cutting off the supply of electric power from the secondary battery to the motor increases the rate of consumption of the electric power from the fuel cells by the motor and thereby the electric power drawn out of the fuel cells, thus enabling the internal temperature of the fuel cells to be raised to the stationary level in a shorter time period.

In accordance with one preferable embodiment of the first fuel cells system, the motor control unit controls the drive of the motor, which is expressed as a d-q axes model, to make a value of electric current flowing through a q-axis winding substantially equal to zero and a value of electric current flowing through a d-axis winding equal to a predetermined value of not less than zero.

Such control causes the motor to consume the electric power through the ohmic loss of the d-axis winding without producing any torque at the drive shaft.

In the embodiment of controlling drive of the motor in the above manner, the first fuel cells system further includes a temperature detection unit that measures internal temperature of the fuel cells. The motor control unit controls the drive of the motor to vary the value of electric current flowing through the d-axis winding according to the observed internal temperature.

This arrangement varies the value of electric current flowing through the d-axis winding according to the internal temperature of the fuel cells to vary the electric power consumed by the motor, thus enabling the internal temperature of the fuel cells to be raised to the stationary level at a high efficiency in a shorter time period.

In accordance with still another preferable application of the present invention, the first fuel cells system further includes: a gaseous fuel generation unit that produces the gaseous fuel from a supply of crude fuel and feeds the produced gaseous fuel of a relatively high temperature to the fuel cells; and a flow regulation unit that regulates a flow rate of the gaseous fuel of the relatively high temperature fed from the gaseous fuel generation unit to the fuel cells. The flow regulation unit increases the flow rate of the gaseous fuel of the relatively high temperature to be greater than a predetermined standard flow rate at the time of activating the fuel cells.

The gaseous fuel fed from the gaseous fuel generation unit generally has a relatively high temperature. Increasing the flow rate of the gaseous fuel supplied from the gaseous fuel generation unit to the fuel cells enables the internal temperature of the fuel cells to be raised to the stationary level in a further shorter time period.

The present invention is also directed to a second fuel cells system having fuel cells that receive a supply of gaseous fuel and generate electric power. The fuel cells system includes: a gaseous fuel generation unit that produces the gaseous fuel from a supply of crude fuel and feeds the produced gaseous fuel of a relatively high temperature to the fuel cells; and a flow regulation unit that regulates a flow rate of the gaseous fuel of the relatively high temperature fed from the gaseous fuel generation unit to the fuel cells. The flow regulation unit increases the flow rate of the gaseous fuel of the relatively high temperature to be greater than a predetermined standard flow rate at the time of activating the fuel cells.

The present invention is further directed to a second method of controlling actuation of a fuel cells system, which includes fuel cells that receive a supply of gaseous fuel and generate electric power, a gaseous fuel generation unit that produces the gaseous fuel from a supply of crude fuel and feeds the produced gaseous fuel of a relatively high temperature to the fuel cells, and a flow regulation unit that regulates a flow rate of the gaseous fuel of the relatively high temperature fed from the gaseous fuel generation unit to the fuel cells.

The second method includes the steps of:
(a) controlling the gaseous fuel generation unit and activation of the fuel cells; and
(b) increasing the flow rate of the gaseous fuel of the relatively high temperature to be greater than a predetermined standard flow rate at the time of activating the fuel cells.

The second fuel cells system of the present invention and the corresponding second method of controlling actuation of the fuel cells system increase the flow rate of the gaseous fuel of the relatively high temperature fed from the gaseous fuel generation unit to the fuel cells to be greater than the predetermined standard flow rate at the time of activating the fuel cells.

The gaseous fuel fed from the gaseous fuel generation unit has a relatively high temperature. In the second fuel cells system and the corresponding second method of controlling actuation of the fuel cells system, increasing the flow rate of the gaseous fuel fed from the gaseous fuel generation unit to the fuel cells at the time of activating the fuel cells thus enables the internal temperature of the fuel cells to be raised to the stationary level in a short time period.

In the configuration of regulating the flow rate of the gaseous fuel in the above manner, it is preferable that the second fuel cells system further includes a temperature detection unit that measures internal temperature of the fuel cells and that the flow regulation unit returns the flow rate of the gaseous fuel to the predetermined standard flow rate when the observed internal temperature reaches a preset level.

The arrangement of returning the flow rate of the gaseous fuel to the predetermined standard flow rate when the internal temperature of the fuel cells reaches the stationary level effectively prevents a wasteful, unnecessary supply of the gaseous fuel to the fuel cells.

In accordance with one preferable application of the present invention, the second fuel cells system further includes a gaseous exhaust flow conduit that introduces an exhaust of the gaseous fuel discharged from the fuel cells into the gaseous fuel generation unit. The gaseous fuel generation unit attains combustion of the introduced gaseous exhaust to obtain part of thermal energy required to produce the gaseous fuel.

As described above, the increased flow rate of the gaseous fuel fed to the fuel cells at the time of activating the fuel cells may increase the quantity of the gaseous fuel that does not contribute to the power generation in the fuel cells. This application causes the non-contributing portion of the gaseous fuel to be effectively used as the gaseous exhaust by the gaseous fuel generation unit, thus preventing the waste of the gaseous fuel.

The present invention is also directed to a first electric vehicle with a fuel cells system mounted thereon. Here the fuel cells system includes: fuel cells that receive a supply of gaseous fuel and generate electric power; a motor that is driven with the electric power output from the fuel cells; and a motor control unit that controls drive of the motor.

In the first electric vehicle, a torque produced at a drive shaft of the motor is transmitted to an axle to give a propulsive force of the electric vehicle. The motor control unit controls the drive of the motor, in order to cause the motor to consume the electric power output from the fuel cells without producing any torque at the drive shaft of the motor at the time of activating the fuel cells.

The present invention is further directed to a second electric vehicle with a fuel cells system mounted thereon. Here the fuel cells system includes: fuel cells that receive a supply of gaseous fuel and generate electric power; a gaseous fuel generation unit that produces the gaseous fuel from a supply of crude fuel and feeds the produced gaseous fuel of a relatively high temperature to the fuel cells; and a flow regulation unit that regulates a flow rate of the gaseous fuel of the relatively high temperature fed from the gaseous fuel generation unit to the fuel cells.

In the second electric vehicle, a torque produced at a drive shaft of a motor is transmitted to an axle to give a propulsive force of the electric vehicle. The flow regulation unit increases the flow rate of the gaseous fuel of the relatively high temperature to be greater than a predetermined standard flow rate at the time of activating the fuel cells.

The first electric vehicle and the second electric vehicle of the present invention respectively have the above-specified fuel cells systems mounted thereon. These arrangements enable the internal temperature of the fuel cells to be raised to the stationary level in a short time period at the time of starting the electric vehicle. The electric vehicle thus quickly starts driving with the fuel cells in the stationary state.

BEST MODES OF CARRYING OUT THE INVENTION

Figure 1:
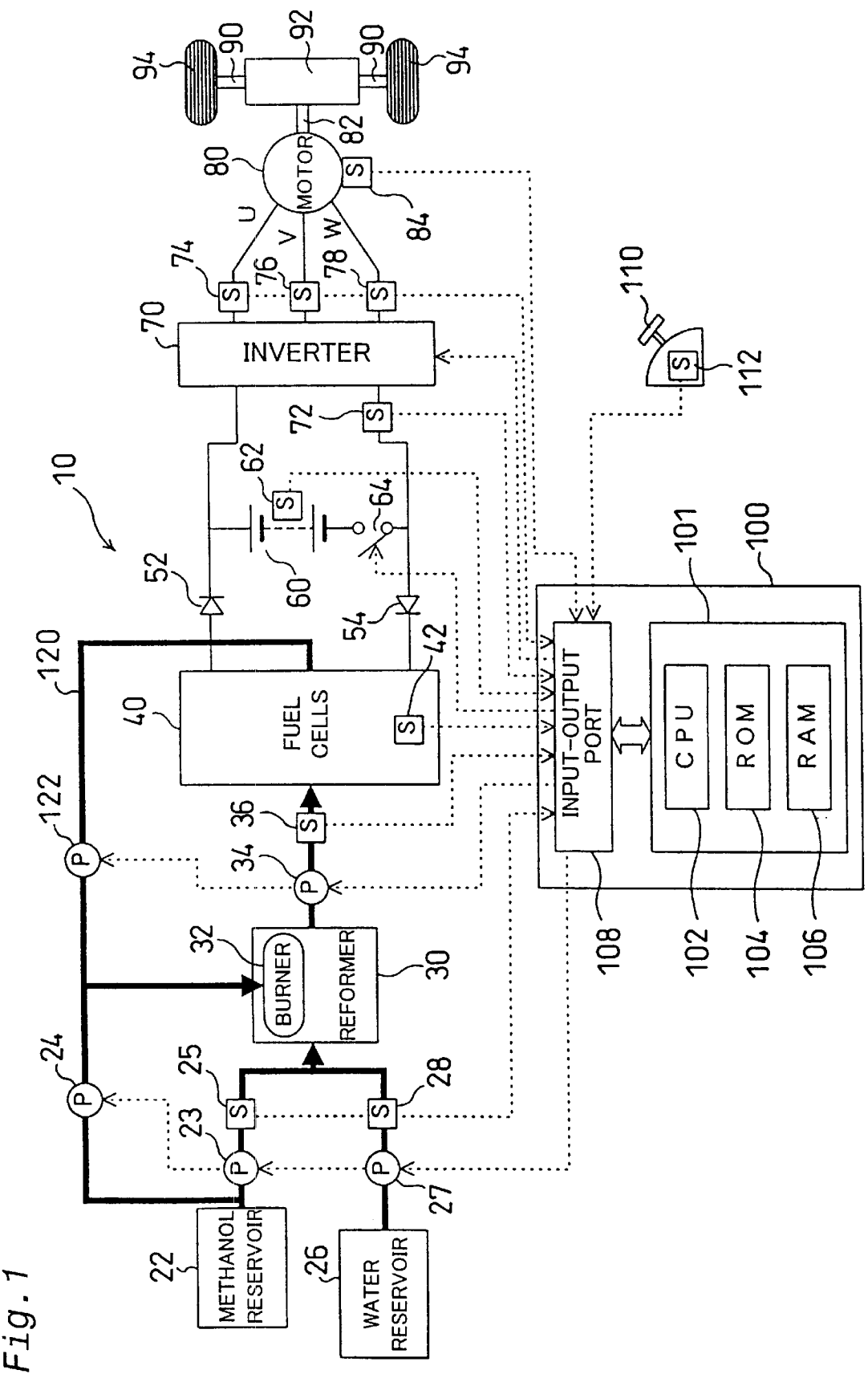
FIG. 1 illustrates the structure of a fuel cells system in one embodiment of the present invention.

One mode of carrying out the present invention is described below as a preferred embodiment. FIG. 1 illustrates the structure of a fuel cells system in one embodiment of the present invention. The fuel cells system of the embodiment is mounted on an electric vehicle.

The following describes the structure and the general functions of the fuel cells system shown in FIG. 1. The fuel cells system 10 shown in FIG. 1 mainly includes a methanol reservoir 22, a water reservoir 26, a reformer 30, fuel cells 40, a secondary battery 60, an inverter 70, a motor 80, and a control unit 100.

The methanol reservoir 22 and the water reservoir 26 respectively store methanol and water therein. Pumps 23 and 27 are regulated in response to control signals output from the control unit 100. The pumps 23 and 27 respectively supply methanol stored in the methanol reservoir 22 and water stored in the water reservoir 26 to the reformer 30 via preset methanol and water supply conduits. A flow sensor 25 measures a flow rate of methanol through the methanol supply conduit, whereas a flow sensor 28 measures a flow rate of water through the water supply conduit. Both the flow sensors 25 and 28 transmit the results of the measurements to the control unit 100.

The reformer 30 generates a hydrogen rich gas (reformed gas) containing hydrogen from supplies of water and methanol as a crude fuel through a steam reforming reaction of methanol expressed as Equation (1) given below:

$$CH_3OH + H_2O \rightarrow 3H_2 + CO_2 \quad (1)$$

More concretely the reformer 30 includes an evaporator unit and a reformer unit, neither of which is illustrated. The evaporator unit vaporizes the supplied water and methanol, produces a gaseous mixture of methanol and water, and supplies the gaseous mixture as a crude fuel gas to the reformer unit.

The reformer unit is filled with a methanol reforming catalyst, such as a cooper-zinc (Cu-Zn) catalyst. In the reformer unit, the crude fuel gas supplied from the evaporator unit is exposed to the methanol reforming catalyst, and the steam refroming reaction of methanol proceeds on the surface of the catalyst. With a progress of this reaction, hydrogen and carbon dioxide are produced to generate a hydrogen rich gas.

The steam reforming reaction of methanol proceeding in the reformer unit is endothermic as a whole. A burner 32 is disposed in the reformer 30 to supply heat required for the reaction. The burner 32 generally receives a supply of methanol from the methanol reservoir 22 via a pump 24 and attains combustion of the supplied methanol as a fuel, so as to produce thermal energy required for the reformer unit. The burner 32 also produces thermal energy required for the evaporator unit to vaporize methanol and water.

The pump 34 is regulated in response to a control signal output from the control unit 100 and feeds the hydrogen rich gas generated by the reformer 30 to the fuel cells 40 via a hydrogen rich gas supply conduit. A flow sensor 36 measures a flow rate of the hydrogen rich gas through the hydrogen rich gas supply conduit and transmits the results of the measurement to the control unit 100.

The fuel cells 40 receive the supply of hydrogen rich gas fed from the reformer 30 as a gaseous fuel and a supply of oxidizing gas (not shown) containing oxygen, and produce electric power through electrochemical reactions expressed by Equations (2) through (4) given below:

$$H_2 \rightarrow 2H^+ + 2e^- \quad (2)$$

$$2H^+ + 2e^- + (\tfrac{1}{2})O_2 \rightarrow H_2O \quad (3)$$

$$H_2 + (\tfrac{1}{2})O_2 \rightarrow H_2O \quad (4)$$

In this embodiment, the fuel cells 40 are polymer electrolyte fuel cells and have a stack structure obtained by laying a plurality of unit cells (not shown) one upon another. Each unit cell includes an electrolyte membrane, an anode, a cathode, and a separator. The supply of hydrogen rich gas is fed to the anode of each unit cell via a gaseous fuel conduit (not shown) to be subjected to the reaction expressed by Equation (2). The supply of oxidizing gas is, on the other hand, fed to the cathode of each unit cell via an oxidizing gas flow conduit (not shown) to be subjected to the reaction expressed by Equation (3). Equation (4) represents the reaction proceeding in the fuel cells as a whole.

The fuel cells 40 supply the electric power produced through these electrochemical reactions to the motor 80 via the inverter 70.

A temperature sensor 42 measures internal temperature of the fuel cells 40 and transmits the results of the measurement to the control unit 100.

A gaseous fuel exhaust flow conduit 120 introduces a gaseous fuel exhaust (hydrogen rich gas exhaust) after the electrochemical reaction at the anodes in the fuel cells 40 to the burner 32 in the reformer 30 via a pump 122.

Diodes 52 and 54 are disposed between the fuel cells 40 and the secondary battery 60, so as to cause the electric current to flow only in one direction between the fuel cells 40 and the inverter 70 or the secondary battery 60.

The secondary battery is connected in parallel with the fuel cells 40 described above, and like the fuel cells 40, supplies the electric power to the motor 80 via the inverter 70. In this embodiment, a lead acid battery is applied for the secondary battery 60. There are a variety of other applicable secondary batteries, such as a nickel-cadmium battery, a nickel-hydrogen battery, and a lithium secondary battery. The secondary battery 60 has a power source capacity, which depends upon an expected driving state of the electric vehicle, that is, an expected magnitude of loading, and a power source capacity of the fuel cells 40 arranged in parallel.

An SOC sensor 62 measures a state of charge of the secondary battery 60 and transmits the results of the measurement to the control unit 100. In a concrete example, the SOC sensor 62 includes an SOC meter that cumulates the products of the values of the charging and discharging electric current and the time in the secondary battery 60. The control unit 100 calculates the state of charge of the secondary battery 60, based on the cumulative value. The SOC sensor 62 may include a voltage sensor that measures the output voltage of the secondary battery 60 or a specific gravity sensor that measures the specific gravity of an electrolytic solution in the secondary battery 60, instead of the SOC meter. In such cases, the control unit 100 calculates the state of charge of the secondary battery 60 from the corresponding observed values.

A secondary battery connecting switch 64 connects and disconnects the secondary battery 60 with and from the inverter 70 in response to a control signal output from the control unit 100.

The inverter 70 converts a d.c. voltage applied by the fuel cells 40 or the secondary battery 60 into a three-phase a.c. voltage and supplies the converted three-phase a.c. voltage to the motor 80. The inverter 70 regulates the amplitude (actually, the pulse width) and the frequency of the three-phase a.c. voltage supplied to the motor 80 in response to a control signal output from the control unit 100, so as to adjust the torque produced by the motor 80.

More concretely, the inverter 70 has six switching elements (for example, bipolar MOSFET (IGBT)) as main circuit elements. The switching operations of these switching elements are regulated in response to a control signal output from the control unit 100, so as to convert a d.c. voltage applied by the fuel cells 40 or the secondary battery 60 into a three-phase a.c. voltage having a desired amplitude and a desired frequency and supply the converted three-phase a.c. voltage to the motor 80.

A current sensor 72 measures a value of electric current flown from the fuel cells 40 or the secondary battery 60 to the inverter 70. Current sensors 74, 76, and 78 respectively measure values of electric current flowing through a U phase, a V phase, and a W phase. These current sensors transmit the results of the measurements to the control unit 100.

The motor 80 is, for example, a three-phase synchronous motor and is driven with the electric power supplied from the fuel cells 40 or the secondary battery 60 via the inverter 70 to produce a torque at a drive shaft 82. The produced torque is transmitted to an axle 90 via a gear 92 to give a rotational driving force to wheels 94. The electric vehicle thus gains the propulsive force to run.

A rotational angle sensor 84 measures a rotational angle of the drive shaft 82 of the motor 80 and transmits the results of the measurement to the control unit 100.

An accelerator pedal position sensor 112 measures a step-on amount of an accelerator pedal 110 and transmits the results of the measurement to the control unit 100.

As shown in FIG. 1, the control unit 100 includes a controller 101 and an input-output port 108. The controller 101 includes a CPU 102, a ROM 104, and a RAM 106. The CPU 102 carries out required operations according to control programs, so as to implement series of processing and controls. The ROM 104 is a memory, in which the control programs and control data used for execution of the operations are stored in advance. The RAM 106 is a memory, in which a variety of data obtained through execution of the operations are temporarily stored. The input-output port 108 transfers the input results of the measurements transmitted from the various sensors to the controller 101, and outputs a variety of control signals to the respective constituents according to the instructions of the controller With referring to FIG. 2, the following describes the details of a processing routine executed at the time of starting the electric vehicle, that is, at the time of actuating the fuel cells system 10 shown in FIG. 1.

Figure 2:
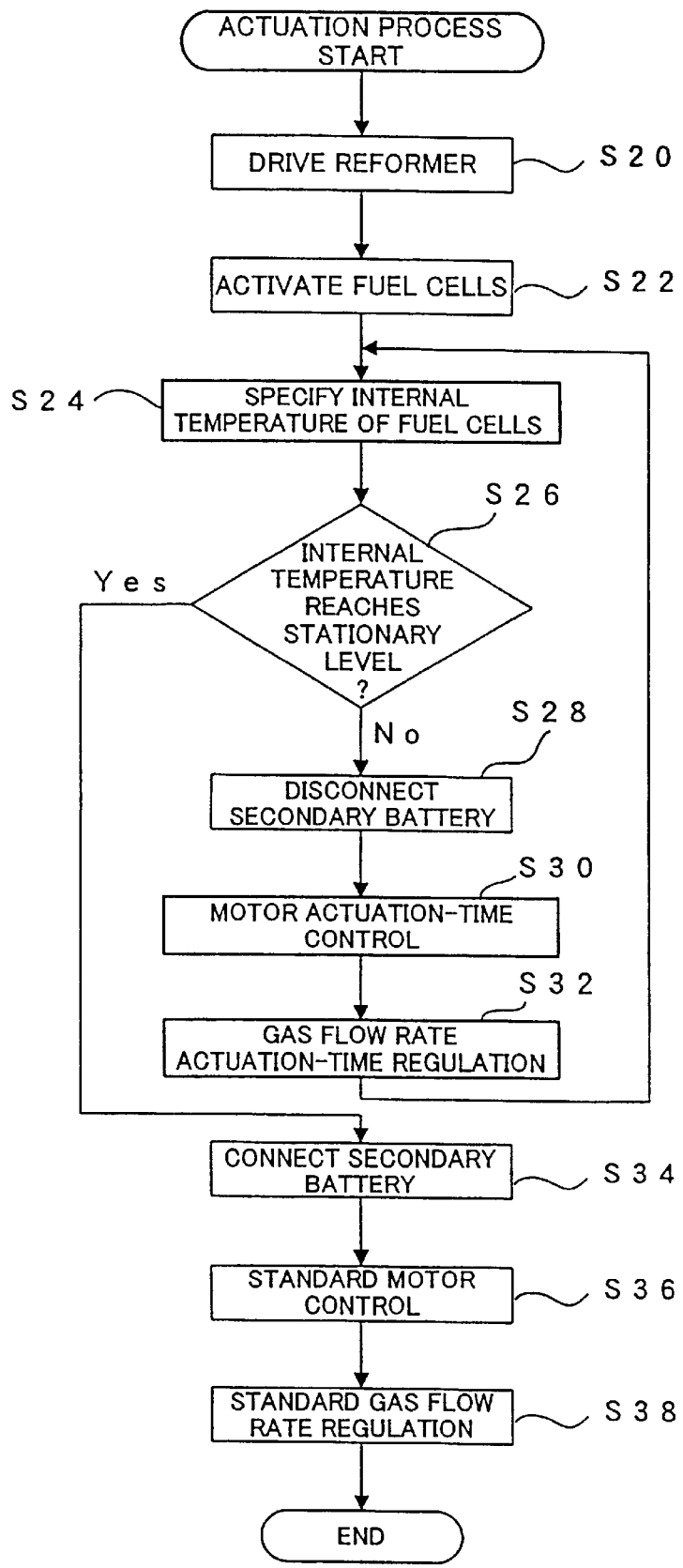
FIG. 2 is a flowchart showing a processing routine at the time of actuating the fuel cells system 10 shown in FIG. 1.

When the electric vehicle starts, the program enters the actuation routine shown in FIG. 2. The control unit 100 first drives the reformer 30 (step S20). In accordance with a concrete procedure, the control unit 100 drives the pumps 23 and 27 to start the supply of methanol and water to the reformer 30, and drives the pump 24 to start combustion in the burner 32. The steam reforming reaction of methanol discussed previously then arises in the reformer 30 to start generating the hydrogen rich gas.

The control unit 100 then activates the fuel cells 40 (step S22). In accordance with a concrete procedure, the control unit 100 drives the pump 34 to start the supply of the hydrogen rich gas generated by the reformer 30 to the fuel cells 40, and starts the supply of the oxidizing gas to the fuel cells 40 via the non-illustrated mechanism. The electrochemical reactions discussed previously then proceed in the fuel cells 40 to start generating electric power.

The control unit 100 subsequently receives the result of the measurement from the temperature sensor 42 to specify the internal temperature of the fuel cells 40 (step S24), and determines whether or not the observed internal temperature reaches the stationary level, that is, the preset temperature enabling the fuel cells to produce a required output (step S26). At the time of activating the fuel cells 40, the fuel cells 40 generally have low internal temperature, which has not yet reached the stationary level. The control unit 100 accordingly proceeds to the processing of step S28.

The control unit 100 drives the secondary battery connecting switch 64 to disconnect the secondary battery 60 from the inverter 70 (step S28). This operation cuts off the supply of electric power from the secondary battery 60 to the motor 80 and enables only the electric power generated by the fuel cells 40 to be supplied to the motor 80 via the inverter 70.

The control unit 100 then controls the motor 80 via the inverter 70 to carry out a motor actuation-time control discussed below (step S30).

In accordance with a concrete procedure, the control unit 100 controls the drive of the motor 80, so as to cause the motor 80 to consume the electric power supplied from the fuel cells 40, while controlling the inverter 70 not to produce any torque at the drive shaft 82 of the motor 80.

Figure 3:
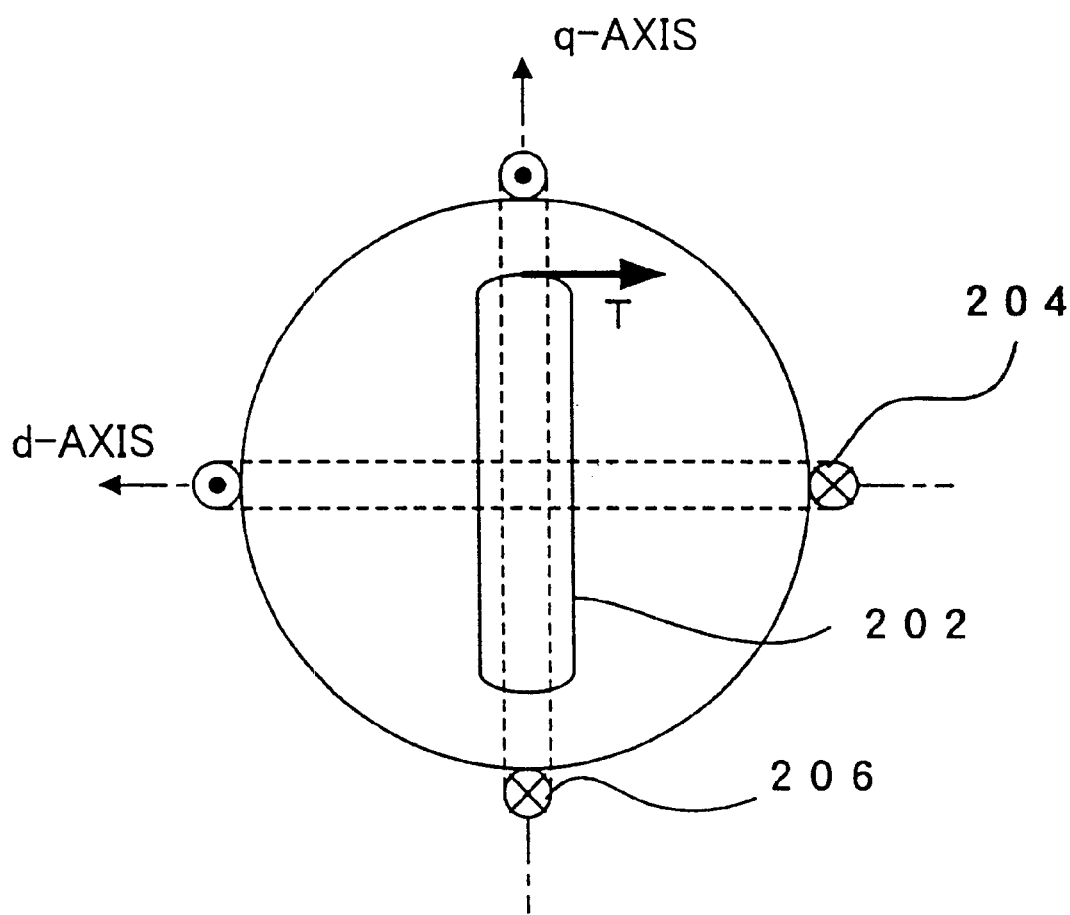
FIG. 3 shows the motor of FIG. 1 as a d-q axes model.

FIG. 3 shows the motor of FIG. 1 as a d-q axes model. As mentioned previously, the motor 80 is a three-phase synchronous motor. In general, the motor is expressed equivalently by the d-q axes model as shown in FIG. 3. The axis passing through the center of the motor and going along the magnetic field produced by a rotor 202 is generally referred to as the d axis, whereas the axis going perpendicular to the d axis in a surface of revolution of the rotor 202 is generally referred to as the q axis. Namely in the exemplified model of FIG. 3, the stator winding along the d axis is called a d-axis winding 204, and the stator winding along the q axis is called a q-axis winding 206.

As clearly understood from FIG. 3, a torque T of the motor is dominated only by a q-axis electric current $i_q$ flowing through the q-axis winding 206.

The torque T of the motor is defined by the q-axis electric current iq according to Equation (5) given below:

$$T = \sqrt{\frac{3}{2}} \phi_0 i_q = K_T i_q \quad (5)$$

where $\phi_0$ denotes the magnitude of the field magnetic flux the motor and $K_T$ denotes the torque constant.

This equation shows that the q-axis electric current $i_q$ should be set equal to zero, in order to prevent the motor from producing any torque.

The d-axis winding 204 is arranged at the specific position to have the magnetic flux from the rotor equal to zero, so that a d-axis electric current $i_d$ makes no contributions to the torque production of the motor but generates an ohmic loss in the q-axis winding 206.

Namely setting a value of greater than zero to the d-axis electric current $i_d$ ensures consumption of the electric power without causing the motor to produce any torque.

In this embodiment, as described above, the control unit 100 carries out the motor actuation-time control via the inverter 70 and regulates the q-axis electric current $I_q$ of the motor 80 to zero, in order to prevent any torque from being produced at the drive shaft 82 of the motor 80. Simultaneously the control unit 100 regulates the d-axis electric current $i_d$ to be greater than zero, in order to cause the motor 80 to forcibly consume the electric power through the ohmic loss in the q-axis winding 206.

As a result of this control operation, the motor 80 consumes the electric power of the fuel cells 40, and the electric power is forcibly drawn out of the fuel cells 40. The forcible output of the electric power enhances the quantity of the electrochemical reactions proceeding in the fuel cells 40 for the purpose of compensation. This increases the Joule heat produced in the fuel cells 40 and abruptly raises the internal temperature of the fuel cells 40. The internal temperature of the fuel cells 40 is thus raised to the stationary level within a short time period.

No torque is produced at the drive shaft 82 of the motor 80. While the output of the fuel cells 40 is not sufficient to satisfy the required output of the electric vehicle, the motor 80 is not driven to rotate the axle 90 and drive the electric vehicle.

As mentioned above, the supply of electric power from the secondary battery 60 to the motor 80 is cut off, so that the motor 80 consumes only the electric power generated by the fuel cells 40. This arrangement enables the electric power to be drawn out of the fuel cells with a high efficiency.

In this embodiment, the control unit 100 specifies the electric power to be consumed by the motor 80 according to the internal temperature of the fuel cells 40 measured by the temperature sensor 42, and regulates the d-axis electric current $i_d$ to a greater value than zero, which corresponds to the specified electric power.

Figure 4:
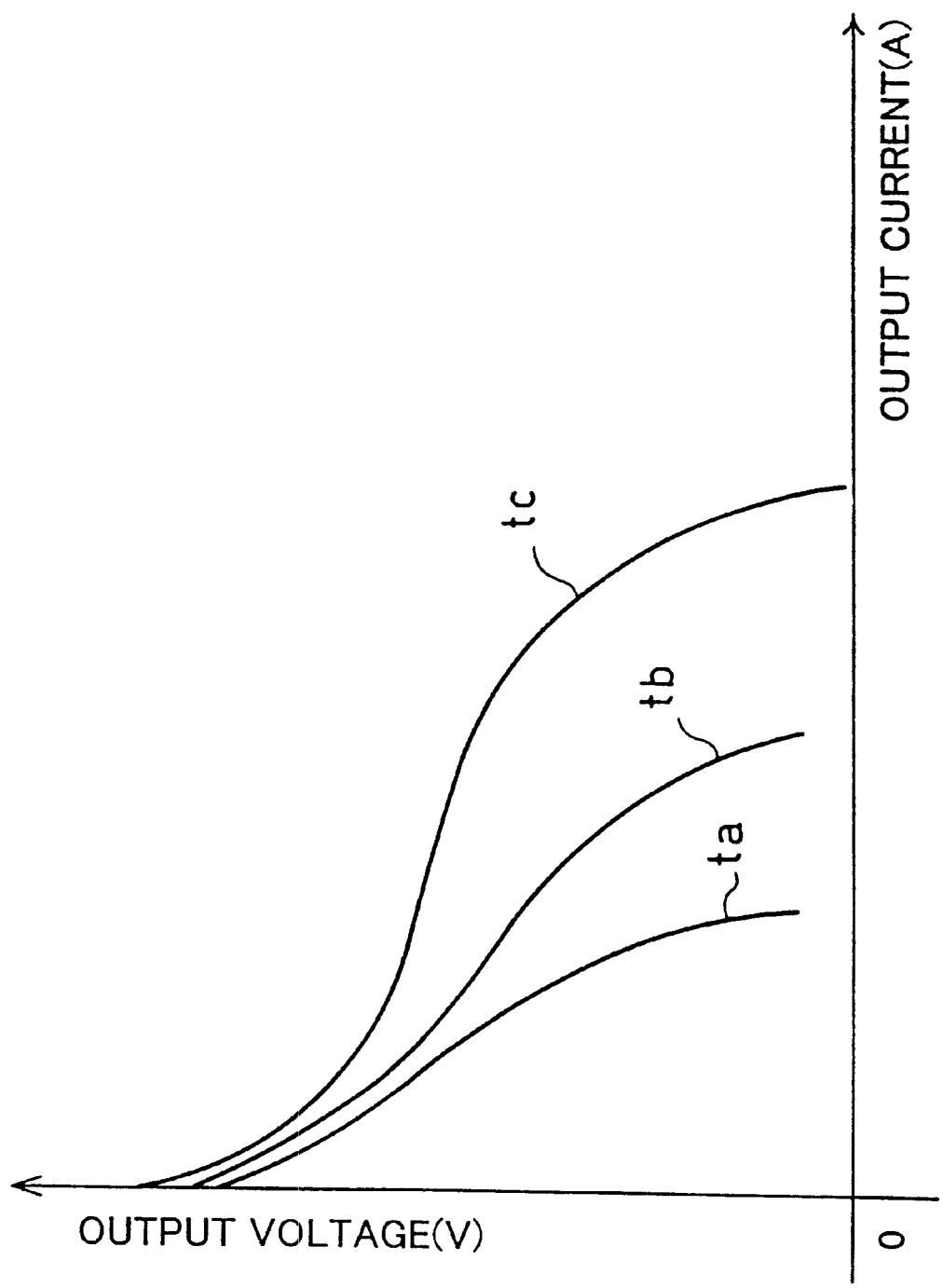
FIG. 4 is a graph showing voltage-current characteristics with regard to the internal temperature of the fuel cells 40 shown in FIG. 1 as a parameter.

FIG. 4 is a graph showing voltage-current characteristics with regard to the internal temperature of the fuel cells 40 shown in FIG. 1 as a parameter. In the graph of FIG. 4, the internal temperature rises in the order of ta, tb, tc (ta<tb<tc).

As shown in FIG. 4, the electric power (that is, the voltage x electric current) producible by the fuel cells 40 depends upon the internal temperature of the fuel cells 40. Under the condition of the low internal temperature (in the case of ta), the fuel cells 40 have only the small producible electric power. The amount of the producible electric power increases with an increase in internal temperature (ta→tb→tc).

Under the condition of the low internal temperature of the fuel cells 40 (for example, in the case of ta), an excessively large value set to the electric power drawn out of the fuel cells 40 (that is, the electric power consumed by the motor 80) may exceed the electric power producible by the fuel cells 40 and result in abruptly decreasing the output voltage of the fuel cells 40.

In another example, the electric power drawn out of the fuel cells is fixed to a certain value corresponding to the low internal temperature of the fuel cells 40 (for example, the certain value is equal to an electric power less than the producible electric power under the condition of the low internal temperature), irrespective of a subsequent variation in internal temperature. In this case, even when the internal temperature of the fuel cells 40 rises to increase the producible electric power, only the fixed electric power, which might be far less than the increased producible level, is drawn out of the fuel cells 40. This worsens the rising efficiency of the internal temperature.

The technique of the embodiment regulates the electric power consumed by the motor 80 according to the internal temperature of the fuel cells 40, so as to cause the electric power drawn out of the fuel cells 40 not to exceed but to be as close as possible to the producible electric power at each internal temperature of the fuel cells 40. In the case of the low internal temperature of the fuel cells 40, the value of the d-axis electric current $i_d$ is regulated to make the electric power consumed by the motor 80 a little less than the producible electric power. With an increase in internal temperature, the value of the d-axis electric current $i_d$ is increased to gradually raise the electric power consumed by the motor 80.

The control unit 100 refers to the results of the measurements transmitted from the temperature sensor 42 as well as the current sensor 72, the current sensors 74 through 78, and the rotational angle sensor 84 and carries out the motor actuation-time control.

The control unit 100 subsequently carries out a gas flow rate actuation-time regulation as discussed below with regard to the pumps 34 and 122 and the other related elements (step S32).

In accordance with a concrete procedure, the control unit 100 regulates the drive of the pump 34 to increase the flow rate of the hydrogen rich gas supplied from the reformer 30 to the fuel cells 40 to be greater than a standard flow rate discussed later.

In general, the quantity of the hydrogen rich gas to be supplied for the electrochemical reactions in the fuel cells is theoretically determined according to the required output of the fuel cells. In the actual state, however, it is required to supply some greater quantity of the hydrogen rich gas than the theoretically determined quantity, in order to ensure the required output of the fuel cells.

The technique of the present invention sets the actual flow rate of the hydrogen rich gas, which is to be supplied to the fuel cells to ensure a desired output of the fuel cells, to a standard flow rate at the desired output. The standard flow rate is set at every output of the fuel cells according to the structure and the performance of each individual set of fuel cells.

An increase in quantity of the hydrogen rich gas generated by the reformer 30 is required to raise the flow rate of the hydrogen rich gas. The control unit 100 accordingly controls the drive of the pumps 23 and 27 to increase the flow rate of methanol supplied from the methanol reservoir 22 to the reformer 30 and the flow rate of water supplied from the water reservoir 26 to the reformer 30 with a required increase in flow rate of the hydrogen rich gas.

As described previously, the burner 32 produces the thermal energy in the reformer 30, so that the hydrogen rich gas output from the reformer 30 has a relatively high temperature. Raising the flow rate of the hydrogen rich gas supplied from the reformer 30 to the fuel cells 40 causes a large quantity of the hydrogen rich gas having a relatively high temperature to be flown into the fuel cells 40. This flow also makes contributions to raise the internal temperature of the fuel cells to the stationary level within a short time period.

Raising the flow rate of the hydrogen rich gas supplied from the reformer 30 to the fuel cells 40 also increases the quantity of the gaseous fuel exhaust, that is, the exhaust of the hydrogen rich gas, discharged from the fuel cells 40. When the flow rate of the hydrogen rich gas supplied to the fuel cells 40 is greater than the standard flow rate, the quantity of hydrogen is in excess in the fuel cells 40. The quantity of hydrogen not involved in the electrochemical reactions increases accordingly. This raises the quantity of hydrogen remaining in the gaseous fuel exhaust discharged from the fuel cells 40. Rejecting the gaseous fuel exhaust results in waste of the valuable resource.

In this embodiment, the control unit 100 controls the drive of the pump 122, in addition to the above control, so as to supply the gaseous fuel exhaust discharged from the fuel cells 40 to the burner 32 in the reformer 30 via the gaseous fuel exhaust flow conduit 120.

This enables hydrogen remaining in the gaseous fuel exhaust to be subjected to combustion as a fuel in the burner 32, thus ensuring the effective use of hydrogen and preventing the wasteful consumption of the valuable resource.

The control unit 100 returns to the processing of step S24 and specifies the internal temperature of the fuel cells 40 based on the result of the measurement transmitted from the temperature sensor 42. The above series of the processing is repeated until the internal temperature of the fuel cells 40 reaches the stationary level.

When the internal temperature of the fuel cells 40 eventually reaches the stationary level, the control unit 100 goes out of the above series of the processing loop and proceeds to the processing of step S34.

At step S34, the control unit 100 drives the secondary battery connecting switch 64 to connect the secondary battery 60 with the inverter 70. This connection enables the electric power output from the secondary battery 60 as well as the electric power generated by the fuel cells 40 to be supplied to the motor 80 via the inverter 70.

The control unit 100 subsequently controls the motor 80 via the inverter 70 to carry out a standard motor control, in place of the motor actuation-time control discussed previously (step S36). In accordance with a concrete procedure, the control unit 100 calculates a required output, for example, from the result of the measurement transmitted from the accelerator pedal position sensor 112 and supplies the electric power output from the fuel cells 40 and the electric power output from the secondary battery 60 to the motor 80 via the inverter 70, so as to produce a required torque at the drive shaft 82. The torque thus produced is transmitted to the axle 90 to drive the electric vehicle.

The control unit 100 refers to the results of the measurements transmitted from the accelerator pedal position sensor 112 as well as the current sensor 72, the current sensors 74 through 78, the rotational angle sensor 84, and the SOC sensor 62 and controls the drive of the motor 80.

Once the internal temperature of the fuel cells 40 reaches the stationary level, the fuel cells 40 can generate a sufficient output to fulfill the required output of the electric vehicle. No problems accordingly arise by changing over the drive control of the motor 80 to the standard control at the stationary time. No problems arise through the connection of the secondary battery 60 to allow the supply of electric power from the secondary battery 60 to the motor 80.

The control unit 100 subsequently carries out a gas flow rate actuation-time regulation with regard to the pump 34 and the other related elements (step S38). In accordance with a concrete procedure, the control unit 100 controls the drive of the pump 34 to return the flow rate of the hydrogen rich gas supplied from the reformer 30 to the fuel cells 40 to the standard flow rate discussed previously, and controls the drive of the pumps 23 and 27 to regulate the flow rates of methanol and water supplied to the reformer 30 according to the flow rate of the hydrogen rich gas.

After the drive control of the motor 80 and the flow rate regulation of the hydrogen rich gas are returned to the standard control and regulation at the stationary time, the program exits from the series of the actuation processing discussed above.

As described above, the technique of this embodiment causes the electric power to be forcibly drawn out of the fuel cells 40 at the time of activating the fuel cells 40, so as to increase the Joule heat produced in the fuel cells 40 and thereby raise the internal temperature of the fuel cells 40 to the stationary level within a short time period. At this moment, no torque is produced at the drive shaft 82 of the motor 80. While the output of the fuel cells 40 is not sufficient to satisfy the required output of the electric vehicle, the electric vehicle does not start running.

At the time of activating the fuel cells 40, raising the flow rate of the hydrogen rich gas supplied from the reformer 30 to the fuel cells 40 causes a large quantity of the hydrogen rich gas having a relatively high temperature to be flown into the fuel cells 40. This flow also makes contributions to raise the internal temperature of the fuel cells to the stationary level within a short time period.

The present invention is not restricted to the above embodiment or its modifications, but there may be many other modifications, changes, and alterations without departing from the scope or spirit of the main characteristics of the present invention.

The procedure of the embodiment discussed above carries out both the motor actuation-time control (step S30) and the gas flow rate actuation-time regulation (step S32) at the time of activating the fuel cells 40. Only either one of the control and the regulation may alternatively be performed according to the requirements.

In the procedure of the embodiment, the secondary battery 60 is disconnected from the inverter 70 at the time of activating the fuel cells 40. In the case where it is desirable to consume the electric power output from the secondary battery 60, the disconnection may be omitted.

In the embodiment discussed above, the motor 80 connected to the axle 90 of the electric vehicle consumes the electric power output from the fuel cells 40 at the time of activating the fuel cells 40. The technique of the present invention is, however, not restricted to this motor but is applicable to any other motors mounted on the electric vehicle for any other purposes.

The reformer 30 uses methanol as the crude fuel for producing the hydrogen rich gas. A hydrocarbon other than methanol, for example, methane or gasoline, may be used as the crude fuel and reformed to produce the hydrogen rich gas. The reforming reaction proceeding in the reformer 30 may be a partial oxidation reforming reaction, in place of or in addition to the steam reforming reaction. The structure of reforming the crude fuel and producing the gaseous fuel discussed above may be replaced by the structure with a hydrogen storage unit using gaseous hydrogen as the gaseous fuel.

The fuel cells 40 are not restricted to the polymer electrolyte fuel cells, but may be other types of fuel cells, such as phosphate fuel cells and solid electrolyte fuel cells.

INDUSTRIAL APPLICABILITY

The technique of the present invention is not restricted to the electric vehicles with the fuel cells system mounted thereon, but is industrially applicable to any other transportation with the fuel cells system mounted thereon, for example, vehicles, ships, and aircraft, and any commercial and domestic electrical equipment to which the fuel cells system is applied.

What is claimed is:

1. A fuel cells system having fuel cells that receive a supply of gaseous fuel and generate electric power, said fuel cells system comprising:

a motor that is driven with the electric power output from said fuel cells; and a motor control unit that controls drive of said motor, wherein said motor control unit controls the drive of said motor, which is expressed equivalently by a d-q axes model, to make a value of electric current flowing through a q-axis winding in the d-q axes model substantially equal to zero and a value of electric current flowing through a d-axis winding in the d-q axes model equal to a predetermined value of not less than zero, out of electric current supplied from said fuel cells, at the time of activating said fuel cells.

2. A fuel cells system in accordance with claim 1, said fuel cells system further comprising:

a temperature detection unit that measures internal temperature of said fuel cells, wherein said motor control unit controls the drive of said motor to vary the value of electric current flowing through said d-axis winding according to the observed internal temperature.

3. A fuel cells system in accordance with claim 1, said fuel cells system further comprising:

a secondary battery that is capable of supplying electric power to said motor, in order to drive said motor; and a battery supply regulation unit that regulates a supply of electric power from said secondary battery to said motor, wherein said battery supply regulation unit cuts off the supply of electric power from said secondary battery to said motor at the time of activating said fuel cells.

4. A fuel cells system in accordance with claim 1, said fuel cells system further comprising:

a gaseous fuel generation unit that produces the gaseous fuel from a supply of crude fuel and feeds the produced gaseous fuel to said fuel cells; and a flow regulation unit that regulates a flow rate of the gaseous fuel fed from said gaseous fuel generation unit to said fuel cells, wherein said flow regulation unit increases the flow rate of the gaseous fuel to be greater than a predetermined standard flow rate at the time of activating said fuel cells.

5. A fuel cells system in accordance with claim 4, said fuel cells system further comprising:

a temperature detection unit that measures internal temperature of said fuel cells, wherein said flow regulation unit returns the flow rate of the gaseous fuel to the predetermined standard flow rate when the observed internal temperature reaches a preset level.

* * * * *